United States Patent [19]

Abo et al.

[11] Patent Number: 4,895,552
[45] Date of Patent: Jan. 23, 1990

[54] CONTROL SYSTEM FOR TRANSMISSION

[75] Inventors: Keiju Abo, Yokosuka; Toshikazu Oshidari, Yokohama, both of Japan

[73] Assignee: Nissan Motor Co., Ltd., Yokohama, Japan

[21] Appl. No.: 330,918

[22] Filed: Mar. 31, 1989

[30] Foreign Application Priority Data

Mar. 31, 1988 [JP] Japan .................................. 63-75973

[51] Int. Cl.$^4$ ............................................. F16H 11/02
[52] U.S. Cl. .......................................... 474/28; 474/18
[58] Field of Search ....................... 474/11, 12, 17, 18, 474/28, 69, 70; 74/866–869

[56] References Cited

U.S. PATENT DOCUMENTS

| 4,548,100 | 10/1985 | Hohn | 74/689 |
| 4,610,183 | 9/1986 | Nobumoto et al. | 474/28 X |
| 4,735,113 | 4/1988 | Yamamuro et al. | 74/866 |
| 4,747,808 | 5/1988 | Moan | 474/18 X |

FOREIGN PATENT DOCUMENTS

| 53-137375 | 11/1978 | Japan . |
| 56-97661 | 8/1981 | Japan . |
| 57-191134 | 11/1982 | Japan . |
| 58-146756 | 9/1983 | Japan . |
| 60-249758 | 12/1985 | Japan . |
| 61-105351 | 5/1986 | Japan . |
| 61-105353 | 5/1986 | Japan . |
| 63-31833 | 2/1988 | Japan . |
| 63-176862 | 7/1988 | Japan . |

Primary Examiner—Thuy M. Bui
Attorney, Agent, or Firm—Foley & Lardner, Schwartz, Jeffery, Schwaab, Mack, Blumenthal & Evans

[57] ABSTRACT

A control system for a transmission is disclosed. The control system includes a high clutch and a low clutch. When the high clutch is engaged, the torque transmission path through a V-belt type continuously variable transmission mechanism is established, while when the low clutch is engaged, the torque transmission path through a gearing mechanism is established. The same hydraulic fluid pressure as prevailing in a driver pulley cylinder chamber is admitted to the high clutch directly or via a suitable selector valve (a neutral valve).

3 Claims, 6 Drawing Sheets

|  | P | R | N | D | L |
|---|---|---|---|---|---|
| FORWARD CLUTCH 52 |  |  |  | ○ | ○ |
| REVERSE CLUTCH 53 |  | ○ |  |  |  |
| LOW CLUTCH 44 |  | ○ |  | ○ | ○ |
| HIGH CLUTCH 60 |  |  |  | ○ | ○ |
| DRIVER PULLEY CYLINDER CHAMBER 20 |  |  |  | ○ | ○ |
| DRIVER PULLEY CYLINDER CHAMBER 32 | ○ | ○ | ○ | ○ | ○ |
| POSITION OF VALVE 108 | OVER-STROKE POSITION | OVER-STROKE POSITION | OVER-STROKE POSITION | NORMAL POSITION | NORMAL POSITION |

FIG.5

CONTROL SYSTEM FOR TRANSMISSION

BACKGROUND OF THE INVENTION

The present invention relates to a control system for a transmission.

Transmissions are known which has two torque transmission paths, one being through a gearing mechanism, the other being through a V-belt type continuously variable transmission mechanism.

Among the transmissions of the above kind, a transmission is known by the applicants. According to this transmission, there are provided a low clutch and a high clutch. When it is desired to transmit torque through the gearing mechanism, the low clutch is engaged, while when it is desired to transmit torque through the V-belt type continuously variable transmission, the high clutch is engaged.

An object of the present invention is to provide a control system which is simple in construction and does not require any substantial modification of already existing control system for the V-belt type continuously variable transmission mechanism.

SUMMARY OF THE INVENTION

According to the present invention, there is provided a control system for a transmission, the transmission including a gearing mechanism combined with a V-belt continuously variable transmission mechanism, the transmission also including a low clutch and a high clutch, wherein when the low clutch is engaged, torque is transmitted by the gearing mechanism, while when the high clutch is engaged, torque is transmitted by the V-belt type continuously variable transmission mechanism, the V-belt type continuously variable transmission mechanism including a driver pulley with a driver pulley cylinder chamber, a follower pulley with a follower pulley cylinder chamber, and a V-belt drivingly interconnecting the driver and follower pulleys, the control system, comprising:

means for supplying a predetermined hydrulic fluid pressure to the driver pulley cylinder chamber; and means for admitting said predetermined hydraulic pressure to the high clutch.

DETAILED DESCRIPTION OF THE EMBODIMENT

Referring to FIGS. 1 to 6, a first embodiment of a control system according to the present invention is described.

Figure 2:
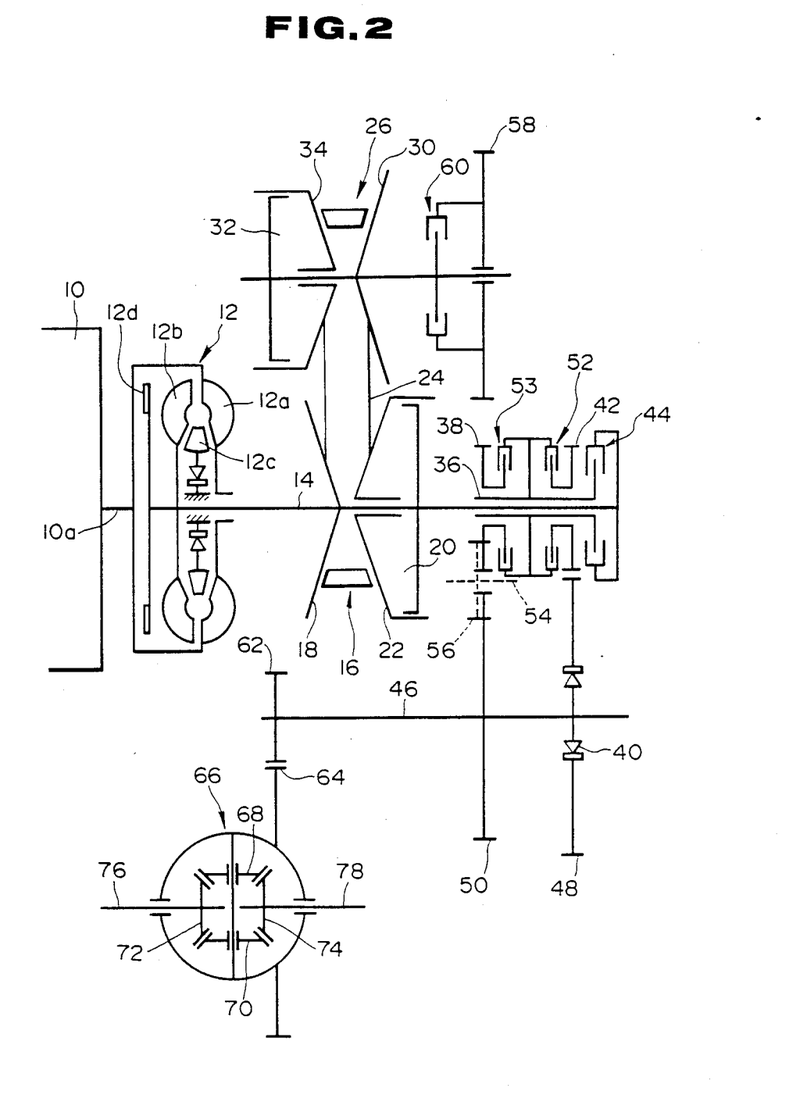
FIG. 2 is a schematic diagram of a transmission including a gearing mechanism combined with a V-belt type continuously variable transmission mechanism.
Figure 3:
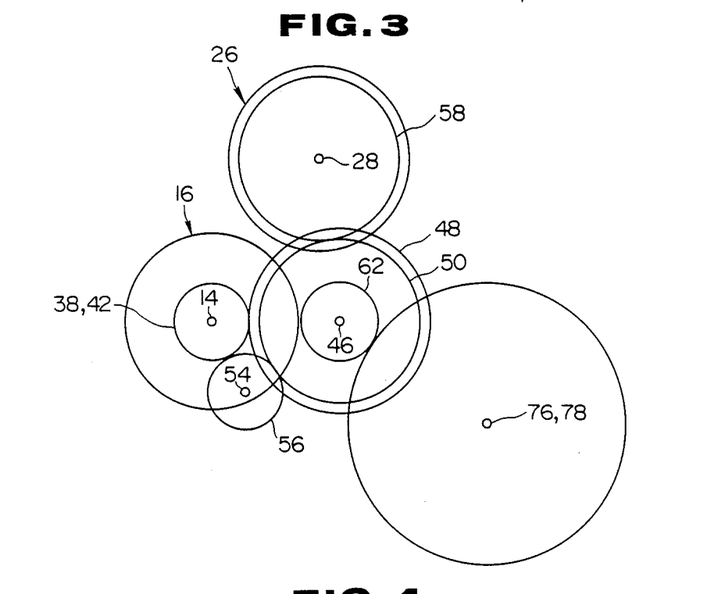
FIG. 3 is a diagram illustrating arrangement of a variety of different shafts of the transmission.

Referring now to FIG. 2, an engine 10 is shown as having an output shaft 10a which a torque converter 12 is coupled in the conventional manner. The torque converter 12 includes, as usual, a pump impeller 12a, a turbine runner 12b, and a stator 12c. It also includes a lock-up clutch 12d which the pump impeller 12a and turbine runner 12b are selectively interconnected with. The turbine runner 12b of the torque converter 12 is drivingly connected to a driver shaft 14. On the driver shaft 14 is a driver pulley 16. the driver pulley 16 includes an axially stationary conical member 18 fixedly connected to the driver shaft 14, and an axially movable conical member 22 connected to the driver shaft 14 in opposed spaced relationship with the stationary conical member 18. The conical members 18 and 22 define therebetween a V-shaped pulley groove therebetween. The driver pulley 16 includes a driver pulley cylinder chamber 20. The movable conical member 22 is axially movable toward the stationary conical member 18 in response to hydraulic pressure developed in the driver pulley cylinder chamber 20, causing the V-shaped pulley groove to decrease its width. The driver pulley 16 is drivingly connected via a V-belt 24 to a follower pulley 26. The follower pulley 26 includes an axially stationary conical member 30 fixedly connected to a follower shaft 28, and an axially movable conical member 34 connected to the follower shaft 28 for axial movement. The conical members 30 and 34 define therebetween a V-shaped pulley groove therebetween. The follower pulley 26 includes a follower pulley cylinder chamber 32. The movable conical member 34 is axially movable toward the stationary conical member 30 in response to hydraulic pressure developed in the follower pulley cylinder chamber 32. The driver pulley 16, V-belt 24, and the follower pulley 26 form a V-belt type continuously variable transmission mechanism. The setting is such that the maximum reduction ratio provided by this V-belt type continuously variable transmission mechanism only is smaller than the reduction ratio provided by a forward gear 42 on the driver shaft side and a forward gear 48 on the output shaft side, which are described later. The driver shaft 14 extends through a hollow shaft 36. The hollow shaft 36 is rotatably supported on the driver shaft 14. Rotatably supported on the hollow shaft 36 are a reverse gear 38 on the driver shaft side and a forward gear 42 on the driver shaft side. The forward gear 42 is selectedly connected the hollow shaft 36 by means of a hydraulic forward clutch 52, while the reverse gear 38 is selectivly connected to the hollow shaft 36 by means of a hydraulic reverse clutch 53. With a low clutch 44, the driver shaft 14 is selectively connected to the hollow shaft 36. Extending in parallel to the driver shaft 14 is an output shaft 46. The output shaft 46 has the above-mentioned forward gear 14 mounted thereto via a one-way clutch 40 and a reverse gear 50 for unitary rotation therewith. The forward gear 48 is in constant mesh with the forward gear 42. The reverse gear 50 is in constant mesh with a reverse idler gear 50 that is rotatable with an idler shaft 54. The reverse idler gear 56 is in constant mesh with the reverse gear 38, too. In FIG. 2, since it is impossible to illustrate them in the cross sectional plane, the reverse idler shaft 54 and reverse idler gear 56 are illustrated by the broken line. Actually, they are arranged as illustrated in FIG. 3. In FIG. 2, the shaft distance and the gear diameter do not reflect the actual relationship. Thus, in order to known the actual relationship, reference should be made to FIG. 3. The follower shaft 28 has a forward gear 58. Via a high clutch 60, the forward gear 58 is connected to the follower shaft 28. As best seen in FIG. 3, the forward gear 58 is in constant mesh with the reverse gear 50. The forward gear 58 and the reverse gear 50 have the same diameter. The output shaft 46 has a reduction gear 62 for rotation therewith. The reduction gear 62 is in consant mesh with a final gear 64 of a differential 66. The differential 66 includes a pair of pinion gears 68 and 70 wich are rotatable with the final gear 64. A pair of side gear 72 and 74 mesh with the pinion gears 68 and 70. The side gears 72 and 74 are coupled with drive shafts 76 and 78, respectively, for rotation therewith.

The neutral state is provided when the low clutch 44 and the high clutch 60 are both released. In this state, the transmission of torque from the driver shaft 14 to the output shaft 46 is interrupted.

On start-up or hill-climbing where a relatively large driving force is required, the forward clutch 52 is engaged and the low clutch 44 engaged. The high clutch 60 is released. In this state, the torque of the output shaft 10a of the engine 10 is transmitted via the torque converter 12 to the driver shaft 14, and further to the hollow shaft 36 via the low clutch 44 that is engaged. The torque of the hollow shaft 36 is transmitted via the forward clutch 52 to the forward gear 42, and further to the forward gear 48 which the gear 42 meshes with. Owing to the fact that the forward gear 48 is drivingly connected via the one-way clutch 40 to the output shaft 46, the torque is transmitted to the output shaft 46. Thereafter, the torque is transmitted via the reduction gear 62 and the final gear 64 to the differential 66 where it is distributed between the drive shafts 76 and 78, causing wheels of the vehicle, not illustrated, to rotate. During the power transmission mentioned above, the torque is not transmitted through the V-belt type continuously variable transmission, but through the gearing mechanism. At the reduction ratio provided by the intgermeshed forward gears 42 and 48, the torque is increased, thus providing a relatively large driving force.

When the operating condition develops and demands a less driving force, the high clutch 60 is engaged with the above described state maintained. This cause the torque transmission through the V-belt type continuously variable transmission. The torque of the driver shaft 14 is transmitted via the V-belt 24 and the follower pulley 26 to the follower shaft 28, and further to the forward gear 58 via the high clutch 60 that is engaged. Since the forward clutch 58 meshes with the reverse gear 50, the torque is transmitted to the output shaft 46, and further to the driver shafts 76 and 78 via the same power path as previously described. In this case, the output shaft 46 rotates at a higher speed than the forward gear 48 does, and thus the one-way clutch 40 idles. This allows the low clutch 44 to be kept engaged. In the manner as described above, the torque is transmitted by the V-belt type continuously variable transmission mechanism. Thus, the reduction ratio can be varied continuously by varying the width of the V-groove of the driver pulley 26 which in turn inducs variation in the width of the follower pulley 26.

In establishing the reverse state, the reverse clutch 53 is engaged, the low clutch 44 is engaged, and the high clutch 60 is released. The engagement of the reverse clutch 53 causes the reverse gear 38 to be connected to the hollow shaft 36 for unitary rotation. In this state, the torque of the drive shaft 14 is transmitted via the low clutch 44, the hollow shaft 36, the reverse clutch 53, the reverse gear 38, the reverse idler gear 56 and the reverse gear 50 to the output shaft 46. Since the reverse idler gear 56 is disposed in the power transmission path, the rotational direction of the output shaft 46 is the opposite to the rotational direction of the output shaft 46 in the cases previously descibed. Thus the vehicle can travel in the reverse direction.

Figure 1:
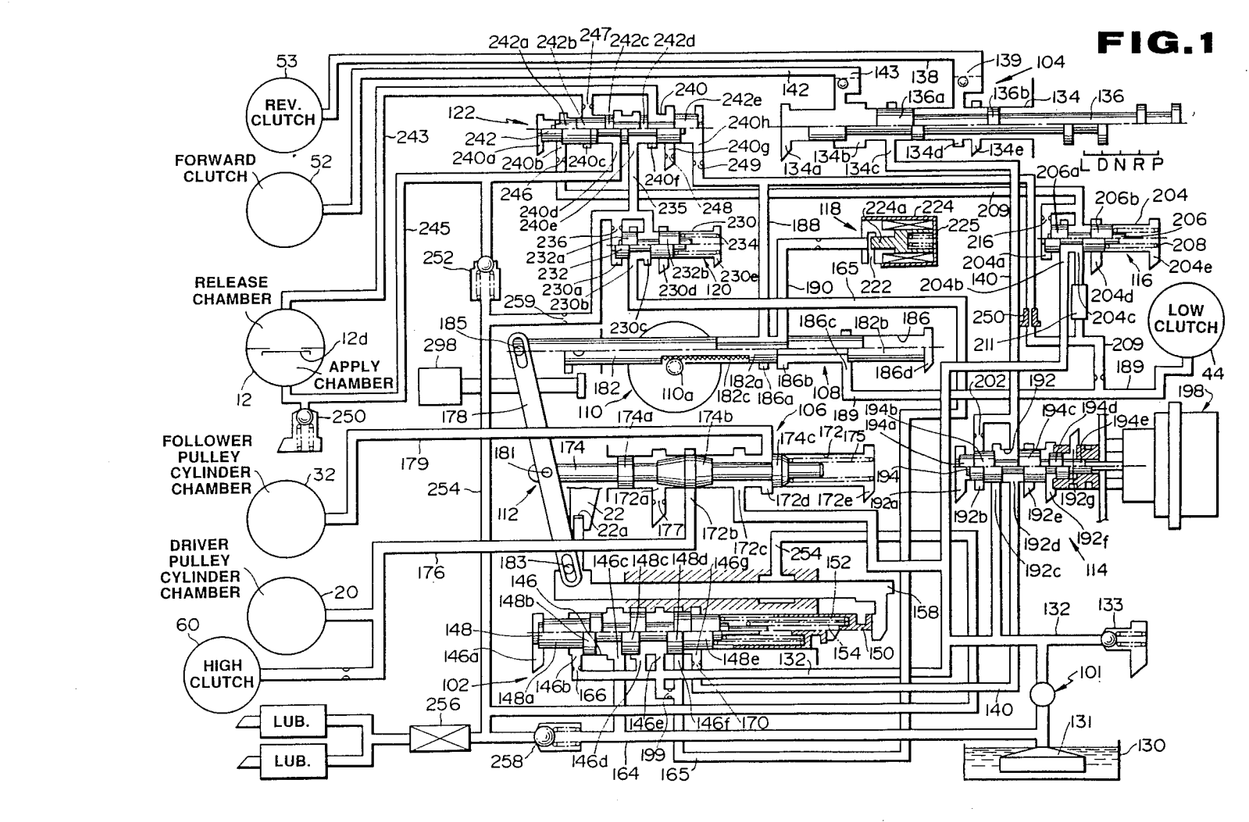
FIG. 1 is a hydraulic circuit of a first embodiment of a control system for a transmission according to the present invention.

A control system for this transmission is now described. As shown in FIG. 1, the control system generally comprises an oil pump 101, a line pressure regulator valve 102, a manual valve 104, a shift control valve 105, a directional control valve 108 for controlling direction of adjustment pressure (which may be called as a shift command valve), a shift operating mechanism 112, a throttle valve 114, a constant pressure regulating valve 116, a solenoid valve 118, a torque converter pressure regulating valve, and a lock-up control valve 122.

The shift control valve 106 has a valve bore 172 provided with five ports 172a, 172b, 172c, 172d and 172e, a spool 174 having three axially spaced lands 174a, 174b, and 174c slidably fit in the valve bore 172, and a spring 175 biasing the spool 174 to the left as viewed in FIG. 1. The port 172b communicates via a hydraulic fluid conduit 176 with the driver pulley cylinder chamber 20, and this conduit 176 communicate with the high clutch 60 at its servo chamber. The port 172a and the port 172e are drain ports, respectively. An orifice 177 is provided at the drain port 172a. The port 172d communicates via a hydraulic fluid conduit 179 with the follower pulley cylinder chamber 32. The port 172c communicates with a hydraulic fluid conduit 132 that serves as a line pressure circuit and thus is supplied with the line pressure. The spool 174 has a lefthand end, as viewed in FIG. 1, rotatably linked via a pin 181 to a middle portion of a lever 178 of the shift operating mechanism 112 which is later described in detail. The land 174b has an axial section with a curved contour. This allows an inflow of hydraulic fluid supplied to the port 172c from the line pressure port 172c to flow partially into the port 172a. Thus, the pressure at the port 172b is determined by a ratio of the amount of hydraulic fluid flowing into the port 172b to the amount of hydraulic fluid discharged out of the drain port 172a. If the spool 174 moves to the left as viewed in FIG. 1, this leftward movement of the spool 174 causes the degree of opening of a clearance on the line pressure side of the port 172b to increase, and the degree of opening of a clearance on the discharge side of the port 172b to decrease. This results in an increase in pressure at the port 172b. The port 172d is always supplied with the line presure from the port 172c. The hydrulic presure developed at the port 172b is supplied via the conduit 176 to the driver pulley cylinder chamber 20, while the hydraulic pressure developed at the port 172d is supplied to the follower pulley cylinder chamber 32. Therefore, the leftward movement of the spool 174, as viewed in FIG. 1, causes an increase in the hydraulic pressure developed in the driver cynder chamber 20, resulting in a decrease in the width of the V-shaped pulley groove of the driver pulley 16. On other hand, this results in an increase in the width of the V-shaped pulley groove of the follower pulley 26.

Therefore, the reduction ratio becomes small since the radius of the running diameter of the V-belt on the driver pulley 16 increases, but the radius of the running diameter of the V-belt on the follower pulley 26 decreases. The reduction ratio becomes large when the spool 174 is urged to move to the right as viewed in FIG. 1.

The shift operating mechanism 112 is connected to thespool 174 of the shift control valve 106 with the lever 178 thereof having its middle linked via the pin 181 to the spool 174. The lever 178 has a one or lower end, as viewed in FIG. 1, connected via a pin 183 to a reduction ratio transmission member 158 and an upper end connected via a pin 185 to the rod 182 of the directional control valve 108. The rod 182 is formed with a rack 182c which a pinion gear 110 of a shift motor 110 meshes with. According to this shift operating mechanism 112, rotating the pinion gear 110a of the shift motor 110 in such a direction as to move the rod 182 to the right, as viewed in FIG. 1, causes the lever 178 to rotate clockwise about the pin 183. This clockwise rotational movement of the lever 178 causes the spool 174 of the shift control valve 174 to move to the right, as viewed in FIG. 1. The rightward movement of the spool 174 of the shift control valve 106 causes a reduction in hydraulic pressure within the driver pulley chamber 20, causing the axially movable conical member 22 of the driver pulley 16 in such a direction as to increase the width of the V-shaped pulley groove. In FIG. 1, the conical member 22 moves to the left. Since the end of the lever 178 is connected via the pin 183 to the reduction ratio transmission member 158, this leftward movement of the conical member 22, as viewed in FIG. 1, causes the lever 178 to rotate clockwise about the pin 185. This clockwise rotation of the lever 178 pulls back the spool 174 to the left, as viewed in FIG. 1, causing an increase in hydraulic pressure within the driver pulley chamber 20, thus causing the reduction ratio to become small. As a result, the driver pulley 16 and the follower pulley 26 shift to stay in a stable state providing a reduction ratio, which stable state is predetermined to one rotary position which the shift motor 110 takes. If the shift motor 110 is rotates in the opposite or reverse direction, the above-mentioned process develops. The rod 182 182 is movable to the right, as viewed in FIG. 1, beyond a position which the maximum reduction ratio is induced at toward an overstroke position. When the rod 182 has moved toward and stayed at the overstroke position, a change-over switch 298 is activated. The output signal of this switch 298 is fed to a control unit. It will now be recognized that when the shift motor 110 is operated in a predetermined shift pattern, the variation of the reduction ratio follows this pattern. Therefore, the variation in reduction ratio in the continuously variable transmission mechanism is controlled by controlling the shift motor 110.

The rotary position which the shift motor 110 takes is determined by a number of pulses supplied to the shift motor 110 by the control unit. The control unit stores a plurality of shift patterns and generates the number of pulses in accordance with one shift pattern selected out of all.

The directional control valve 108 includes a valve bore 186 provided with ports 186a, 186b, 186c and 186d, and a rod 182 with lands 182a and 182b recived in the valve bore 186. The port 186a communicates with a hydraulic fluid conduit 188. The port 186b communicates via a hydraulic fluid conduit 190 with the solenoid valve 118. The port 186c communicates with a hydraulic fluid conduit 189. The port 186d is a drain port. Normally, the ports 186a and 186b communicate with each other via a space defined between the lands 182a and 182b. When the rod 182 moves beyond the position corresponding to the maximum reduction ratio into the overstroke position, the port 186a is covered by the land 182a, while the port 186b is allowed to communicate with the port 186c. The above-mentioned hydraulic fluid conduit 189 communicates with the low clutch 44.

The other valves illustrated in FIG. 1 have substantially the same as their counterparts disclosed in laying-open Japanese patent publication No. 61-105351. The hydraulic circuit except the low clutch 44 and the high clutch 60 is substantially the same as a hydraulic circuit of a control system disclosed in European Patent application published under publication number 0180209 on May 7, 1986 or U.S. patent application Ser. No. 922,400, now U.S. Pat. No. 4,735,113 issued to Yamamuro et al. on Apr. 5, 1988.

The operation of this embodiment is hereinafter described. When the rotation of motor 110 toward the maximum reduction ratio causes the rod 182 to move beyond the predetermined position corresponding to the maximum reduction ratio to the overstroke position, the directional control valve 108 takes a state as illustrated by the lower half thereof as viewed in FIG. 1. In this state of the directional control valve 108, the conduit 190 is allowed to communicate with the conduit 189, establishing a state where the hydraulic fluid pressure adjusted by the solenoid valve 118 is supplied to the low clutch 44. Thus, the torque capacity of the low clutch 44 becomes adjustable by the solenoid valve 118. Upon the directional control valve 108 staying in the overstroke position, the spool 174 of the shift control valve 106 which is linked via the lever 178 to the rod 182 is biased to the right as viewed in FIG. 1 and thus the port 172b is allowed to communicate with the drain port 172a. Thus, the driver pulley cylinder chamber 20 and high clutch 60 are drained and thus depressurized. As a result, the low clutch 44 only is left engaged, so that the torque is transmitted via the gearing mechanism. The torque is therefore multiplied at the reduction ratio determined by the forward gears 42 and 48, producing a large driving force.

Figure 4:
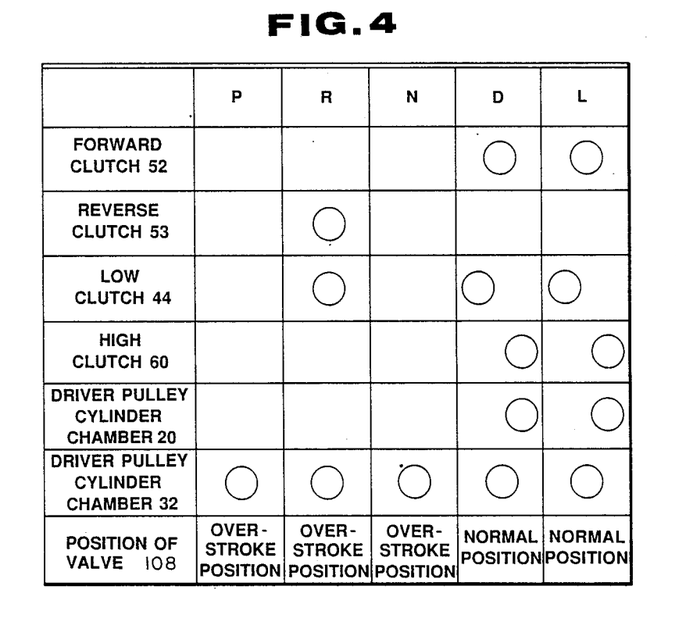
FIG. 4 is a table.
Figure 5:
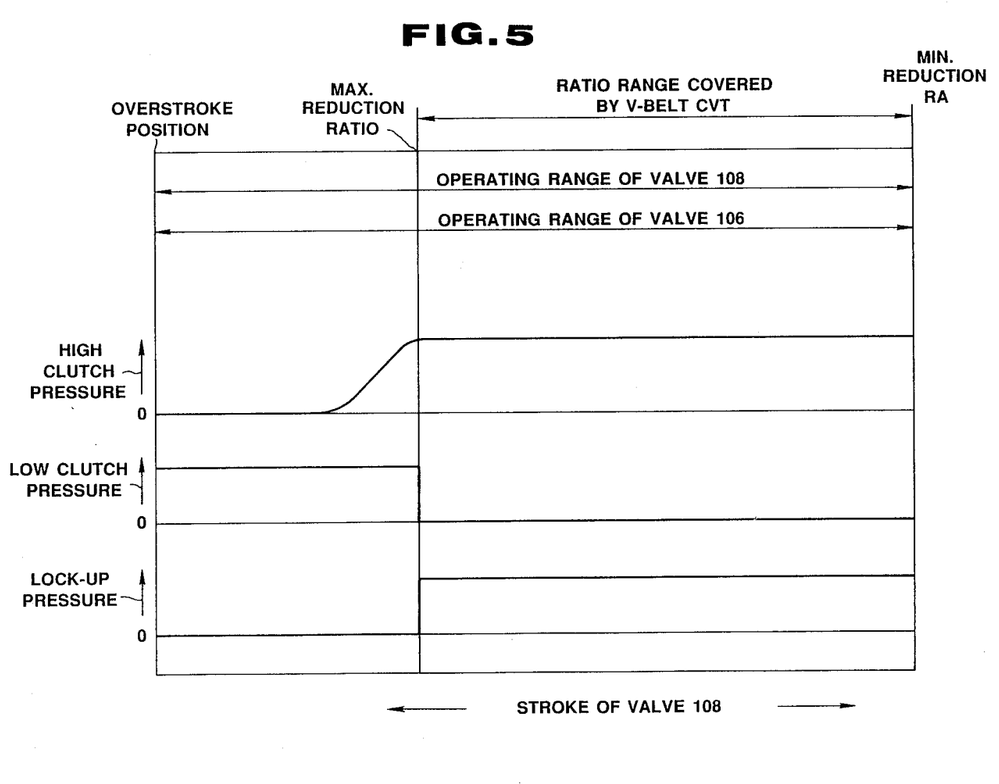
FIG. 5 is a graphical representation of variation of different pressure versus the stroke of valve 108.
Figure 6:
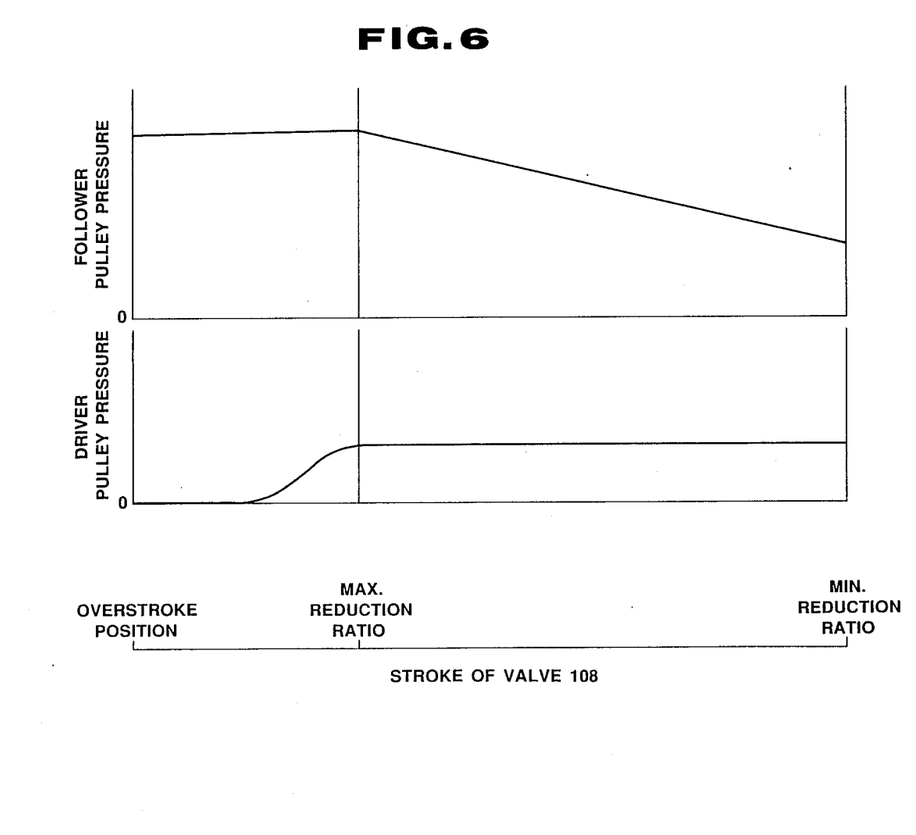
FIG. 6 is a graphical representation of variation of pressures applied to driver and follower pulley cylinder chambers of the V-belt type continuously variable transmission mechanism.

When the operating condition develops and demands a less driving force, the shift motor rotates toward the minimum reduction ratio, the rod 182 moves toward the minimum reduction ratio side beyond the predetermined position corresponding to the maximum reduction ratio. This movement of the rod 182 causes the lever 178 to displace the spool 174 to the left as viewed in FIG. 1. This causes the land 174b of the spool 174 to close communication of the port 172b with the drain port 172a and open communication of the port 172b with the line pressure port 172c, allowing the supply of hydraulic fluid to the port 172b from the line pressure port 172c. Thus, the driver pulley cylinder chamber 20 is supplied with the hydraulic fluid pressure and the high clutch 60 is also supplied with the hydraulic fluid pressure and engaged. Thereafter, the torque is transmitted by the V-belt type continuously variable transmission mechanism and the reduction ratio is continuously variable by adjusting the widths of the V-shaped pulley grooves of the driver pulley 16 and the follower pulley 26. Under this operating condition, although the low clutch 40 is kept engaged, since the one-way clutch 40 idles, the torque is transmitted via the V-belt type continuously variable transmission mechanism. Under this condition, the directional control valve 108 allows the conduit 188 to communicate with the conduit 190, rendering the solenoid valve 118 to control the lock-up control valve 122. Thus, the engagement of the lock-up clutch 12d is controlled by the solenoid valve 118. FIG. 4 shows a table where which one or ones of the clutches 52, 53, 44 and 60 and two pulley cylinder chambers 20 and 32 are supplied with hydraulic fluid pressure for each of five positions, namely P (parking), R (reverse), N (neutral), D (drive), and L (low) range positions, which the spool 136 of the manul valve 104 is placed at. The sign o denotes the element which is supplied with hydraulic fluid pressure. Also shown in the table is the position which the directional control valve 108 takes in relation to the positions of the spool 136 of the manual valve 104. The valve 108 assumes the overstroke position when the spool 136 of the manual valve 104 is placed at P or R or N range position. Since the valve 108 is in the overstroke position and the solenoid valve 118 drains the conduit 190 when the spool 136 of the manual valve 104 is placed at P or N range position, no hydraulic fluid pressure is applied to the low clutch 44, leaving same released. FIG. 5 shows the variations of a variety of different pressures versus the stroke of the rod 182 of the directional control valve 108. FIG. 6 shows the variations of pressures within the driver pulley cylinder chamber 20 and the follower pulley cylinder chamber 32 versus the stroke of the rod of the directional control valve 108. As will be appreciated from FIG. 6, the driver pulley pressure within the driver pulley cylinder chamber 20 increases gradually before the tod 182 of the directional control valve 108 reaches the predetermined position corresponding to the maximum reduction ratio provided by the V-belt continuously variable transmission mechanism during the stroke away from the overstroke position. Since it is engaged with this same hydraulic pressure, the high clutch 60 is engaged smoothly without any substantial shock. Therefore, a smooth shift in the torque transmission path from the gearing mechanism to the V-belt type continuously variable transmission mechanism is made without any substantial shock.

Figure 7:
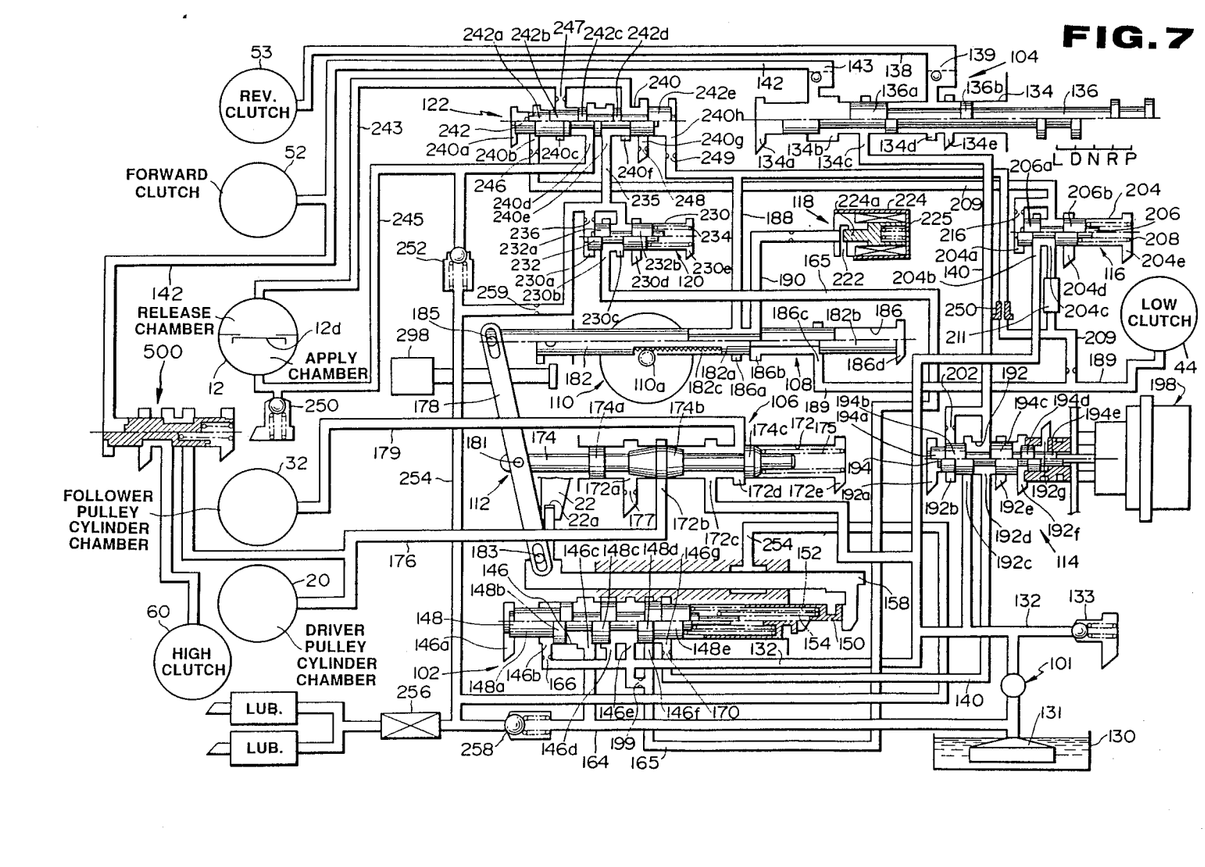
FIG. 7 is a similar view to FIG. 1 showing the second embodiment according to the present invention.

FIG. 7 shows a second embodiment according to the present invention. This second embodiment is substantially the same as the previously described first embodiment except the provision of a selector valve 500 (or a neutral valve). This valve 500 is disposed in a branch conduit extending from a conduit 176 toward a high clutch 60. The selector valve 500 shifts between two positions in response to a forward signal pressure in a hydraulic fluid conduit 142. Specifically, the selector valve 500 assumes one position allowing the high clutch 60 to communicates via the branch conduit with the conduit 176 when the forward signal pressure is present in the conduit 142. When the forward signal pressure is not present, the selector valve 500 assume the other position allowing draining of hydraulic fluid from the high clutch 60 by connecting same to the drain port. Thus, when the spool 136 of the manual valve 104 is placed at N or R or P range position where there occurs no forward signal pressure, the high clutch 60 is left released and thus there is no transmission of torque through the V-belt type continuously variable transmission mechanism. Thus, the nuetral state is established immediately after the driver moves the spool 136 of the manual valve from D range position to N range position while the vehicle is travelling forward because the hydraulic fluid is discharged from the high clutch 50 immediately.

What is claimed is:

1. A control system for a transmission, the transmission including a gearing mechanism combined with a V-belt type continuously variable transmission mechanism, the transmission also including a low clutch and a high clutch, wherein when the low clutch is engaged, torque is transmitted by the gearing mechanism, while when the high clutch is engaged, torque is transmitted by the V-belt type continuously variable transmission mechanism, the V-belt type continuously variable transmission mechanism including a driver pulley with a driver pulley cylinder chamber, a follower pulley with a follower pulley cylinder chamber, and a V-belt drivingly interconnecting the driver and follower pulleys, the control system, comprising:

means for supplying a predetermined hydraulic fluid pressure to the driver pulley cylinder chamber; and means for admitting said predetermined hydraulic pressure to the high clutch.

2. A control system as claimed in claim 1, including means for supplying a hydraulic fluid pressure to the low clutch when a predetermined member has moved to an overstroke position beyond a predetermined position coresponding to the maximum reduction ratio to be provided by the V-belt type continuously variable transmission.

3. A control system as claimed in claim 1, wherein said admitting means includes valve means for draining hydraulic fluid from the high clutch upon selecting a range position other than a predetermined range position.

* * * * *